Dec. 9, 1924.
J. K. PIERCE
FLEXIBLE JOINT
Filed Oct. 3, 1921
1,519,047
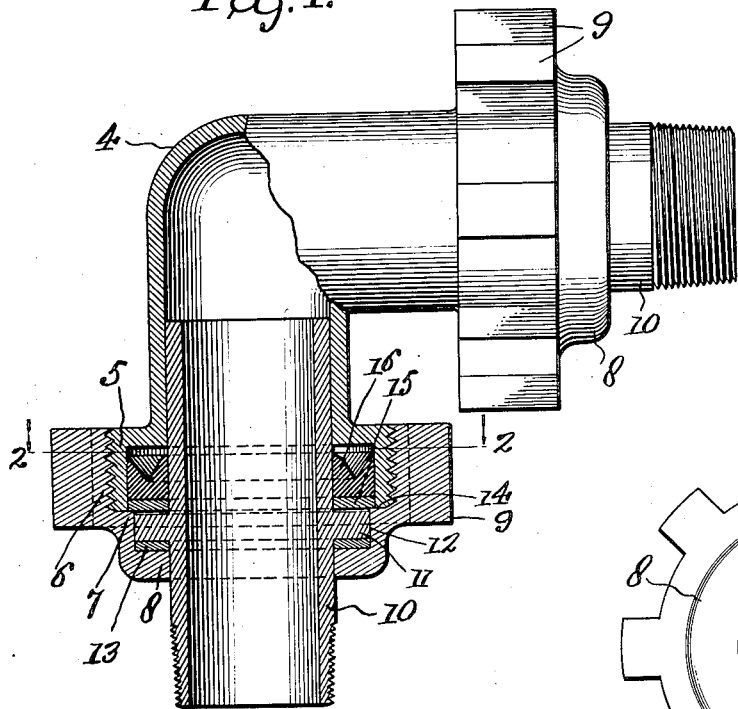
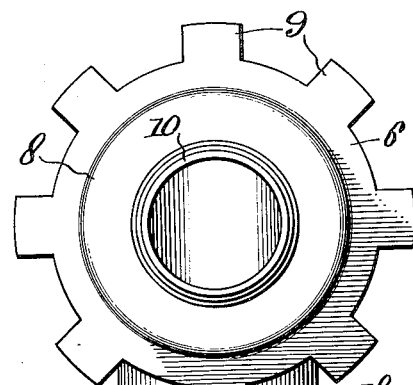
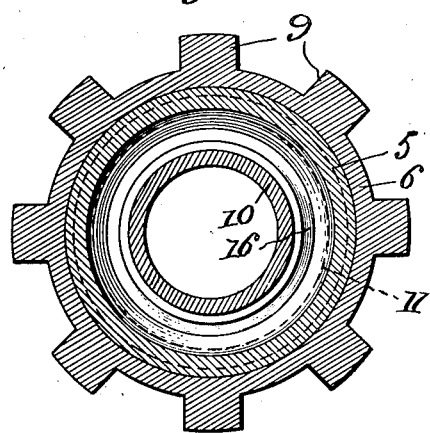
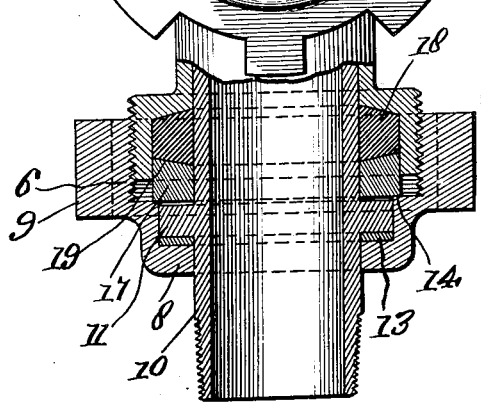
Inventor
John K. Pierce
by Wilkinson & Giusta
Attorneys Patented Dec. 9, 1924.

1,519,047

UNITED STATES PATENT OFFICE.

JOHN K. PIERCE, OF FORT WORTH, TEXAS.

FLEXIBLE JOINT.

Application filed October 3, 1921. Serial No. 504,921.

*To all whom it may concern:*

Be it known that I, JOHN K. PIERCE, a citizen of the United States, residing at Fort Worth, in the county of Tarrant and State of Texas, have invented certain new and useful Improvements in Flexible Joints; and I do hereby declare the following to be a full, clear, and exact description of the invention, such as will enable others skilled in the art to which it appertains to make and use the same.

My present invention relates to improvements in flexible joints, and has for an object to provide a joint of this character in which the swivel connection will work more easily and last longer than any joint of present construction.

Another object of the invention is to provide a flexible joint in which the pressure is removed to a great extent from the swivel connection to enable it to be rotated more easily, at the same time not sacrificing the tightness of the joint.

A further object of the invention resides in providing an improved construction of flexible joint in which the compression of the packing will be removed from the flange of the swivel connection by a simple and inexpensive construction not requiring the use of any special gaskets or washers.

The invention will be more fully understood after reference to the accompanying drawings, in which like parts are indicated by similar reference symbols throughout the several views, and in which:—

Figure 1 is a view partially in elevation, and partially in section, of an improved flexible joint constructed according to the present invention.
Figure 2 is a sectional view taken on the line 2—2 in Figure 1; and Figure 3 is partially an end view and partially a section showing a modification.

Referring more particularly to the drawings, and for the present to Figs. 1 and 2, 4 designates an elbow having flexible joints at each end thereof. The end portions of the elbow are enlarged into cylindrical heads 5 which are exteriorly threaded, and provide for receiving the internally threaded nut 6 having a double stepped flange 7 and 8. The flange portion 7 is adapted to take against the end of the cylindrical head 5 and forms a stop therewith to limit the screwing movement of the nut 6 upon the head; the nut 6 being provided with a number of peripheral lugs 9 to enable it to be turned with facility.

The segmental flange 8 is of a character to fit snugly about the swivel pipe section 10, which extends through the nut 6 and the head 5 and into a portion of the elbow 4; such section 10 being free to turn in these parts in either direction. Such swivel section 10 carries an annular shoulder 11, fitting snugly in and rotatable within a bearing portion 12 of the nut 6 lying directly within the flanged portion 7. A washer 13 is interposed between the shoulder 11 and the segmental flange 8 to take up the weight of the pipe section 10 and to assist in forming a tight joint and in making the parts free for rotation. The washer 13 may be replaced when worn.

A shoulder 14 is arranged inwardly of the portion 12, and between such portion and the inner surface of the cylindrical head 5. This shoulder 14 is for the purpose of receiving and partially supporting the outer peripheral edge portion of a washer 15 lying within the cylindrical head 5 at the outer portion thereof and beneath the gasket 16. The gasket 16 is preferably of a V-construction to receive the pressure of the fluid between the divergent wings thereof, such fluid having a tendency to expand the wings against the adjacent portions and to thereby form a tight joint.

In the use of a device of this character the weight of the gasket 16 and the pressure thereon is receivable upon the washer 15, but is not transmitted to the shoulder 12 which turns with the swivel section 10. The weight and the pressure of the gasket 16 is rather received upon the shoulder 14, leaving the shoulder 12 for comparatively free rotation. This construction makes it comparatively easy to turn the section 10 in either direction, and moreover it avoids that great amount of friction which is found to wear away the parts in a comparatively small space of time.

Referring more particularly to Fig. 3 a similar cylindrical head and cooperating nut are shown herein, in combination with a shoulder 11. The difference in this instance resides in the provision of a washer 17 in combination with a gasket 18 of different character than that shown in Figs. 1 and 2. The gasket 18 is made without the V-shaped groove, and is of a solid annular ring form with beveled edges 19 between the gasket 18 and the washer 17. The washer is also of an enlarged form as compared with the washer 15 in Fig. 1, but the same principle obtains herein, in that the washer 17 rests upon the shoulder 14. In this case pressure is put upon the gasket 18 and washer 17 by the screwing of the nut 6 upon the cylindrical head 5.

It will be obvious that various modifications might be made in the herein described construction, and in the combination and arrangement of parts which could be used without departing from the spirit of my invention; and I do not mean to limit the invention to such details except as particularly pointed out in the claim.

Having thus described my invention what I claim and desire to secure by Letters Patent of the United States is:—

A flexible pipe joint comprising a pipe section having an enlarged cylindrical portion, a second pipe section fitted within the first section and rotatable therein, said second section having an external annular flange lying outside the plane of the end of the cylindrical portion of the first named section, a nut threaded upon said cylindrical portion of the first section and having two stepped internal shoulders, one of said shoulders being disposed outwardly of the second pipe section flange, said nut having an opening to receive said second section and to provide a bearing therefor, the second shoulder in the nut adapted to abut against the end of the cylindrical portion of the first section and projecting inwardly of the internal wall of said cylindrical section, a washer received upon the inner face of the second section flange and upon the inwardly projecting portion of the second shoulder, a gasket held within the cylindrical portion of the first section and lying against said washer, and a second washer between the flange and said first shoulder.

JOHN K. PIERCE.